C. BRUHL.
MACHINE FOR STRIPPING THE HIDES FROM CATTLE.
No. 66,558. Patented July 9, 1867.
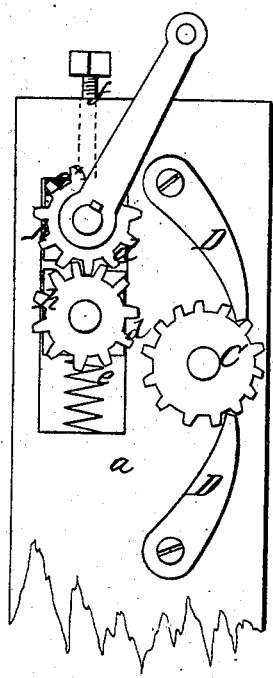
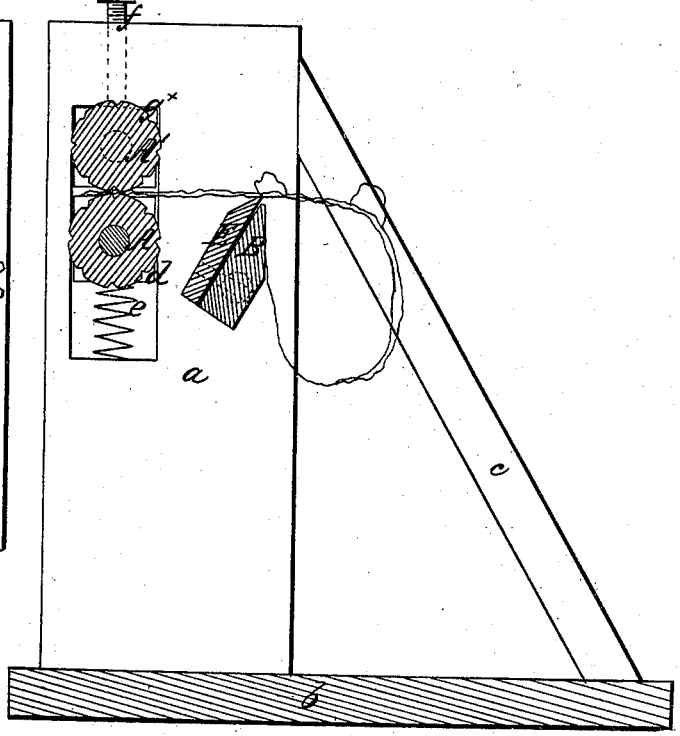

United States Patent Office.

CHRISTOPHER BRÜHL, OF GREEN POINT, NEW YORK.

Letters Patent No. 66,558, dated July 9, 1867.

---

IMPROVEMENT IN MACHINE FOR STRIPPING THE HIDE FROM CATTLE.

---

The Schedule referred to in these Letters Patent and making part of the same.

---

TO ALL WHOM IT MAY CONCERN:

Be it known that I, CHRISTOPHER BRÜHL, of Green Point, in the county of Kings, and State of New York, have invented a new and useful Device for Stripping Hides from Beeves and other animals, and that the following description taken in connection with the accompanying drawings, hereinafter referred to, forms a full and exact specification of the same, wherein I have set forth the nature and principles of my said improvements, by which my invention may be distinguished from all others of a similar class, together with such parts as I claim, and desire to have secured to me by Letters Patent.

This invention relates to a new and useful machine for stripping hides from beeves and other animals, it being designed to supersede the manual prosecution of such work, which is now extensively practised, at a considerable expenditure of time and labor. In the accompanying sheet of drawings—

Figure 1 is a transverse vertical section of my invention.

Figure 2, a side view of a portion of the same.

Similar letters of reference indicate like parts.

The frame of the machine consists of two uprights, $a\ a$, attached to a horizontal base, $b$, and braced by two inclined bars, $c$. Between these uprights, $a\ a$, two horizontal fluted rollers, A A, are fitted, one over the other, in the same axial plane. The bearings $d$ of the lower roller A rest on springs $e$, and screws $f$ bear upon the bearings $g^x$ of the upper roller A', as shown in both figures. By this means the pressure of the two rollers A A' may be graduated as desired, and a yielding movement allowed the lower roller. The rollers are connected by gears $h$ at one end. B represents a bar, which constitutes a knife-stock. This bar has journals at its ends, which pass through the uprights $a\ a$, and have toothed wheels C on them, into which pawls D D catch, (see fig. 2,) to hold the knife-stock in proper position. The knife E is attached to the stock B by screws in such a manner as to admit of the adjustment of the knife to compensate for wear.

The animal to be operated upon is cut longitudinally the whole length of the belly and chest, and the hide or skin loosened and detached from the carcass a short distance at one side of the cut, and this detached edge is inserted between the rollers A A, and over the knife E, as shown in red, fig. 1, and the rollers A A' being turned, the hide will be stripped from the carcass. The knife E may be adjusted to the proper angle, and retained in the desired position, by the wheels and ratchets previously described.

Having thus described my invention, I claim as new, and desire to secure by Letters Patent—

The fluted rollers A A', in combination with the adjustable knife E, all arranged substantially in the manner as and for the purpose set forth.

The above specification of my invention signed by me this 21st day of March, 1867.

CHRISTOPHER BRÜHL.

Witnesses:
 WM. F. MCNAMARA,
 ALEX. F. ROBERTS.